United States Patent
Shimode et al.

(10) Patent No.: US 9,234,446 B2
(45) Date of Patent: Jan. 12, 2016

(54) EXHAUST GAS PURIFICATION APPARATUS FOR AN INTERNAL COMBUSTION ENGINE

(75) Inventors: Kazumasa Shimode, Susono (JP); Makoto Ogiso, Mishima (JP); Kazuya Takaoka, Susono (JP); Daisuke Shibata, Numazu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/345,985

(22) PCT Filed: Sep. 20, 2011

(86) PCT No.: PCT/JP2011/071347
§ 371 (c)(1),
(2), (4) Date: Apr. 23, 2014

(87) PCT Pub. No.: WO2013/042190
PCT Pub. Date: Mar. 28, 2013

(65) Prior Publication Data
US 2014/0230415 A1  Aug. 21, 2014

(51) Int. Cl.
*F01N 3/00* (2006.01)
*F01N 3/20* (2006.01)
(Continued)

(52) U.S. Cl.
CPC .......... *F01N 3/2066* (2013.01); *B01D 53/9477* (2013.01); *B01D 53/9495* (2013.01); *F01N 3/023* (2013.01); *F01N 3/106* (2013.01); *F01N 3/208* (2013.01); *F01N 9/002* (2013.01); *F01N 13/009* (2014.06); *B01D 53/944* (2013.01); *B01D 53/9431* (2013.01); *B01D 2251/2067* (2013.01); *F01N 2550/04* (2013.01); *F01N 2560/05* (2013.01); *F01N 2610/02* (2013.01); *F01N 2900/0422* (2013.01); *F01N 2900/1622* (2013.01); *Y02T 10/24* (2013.01); *Y02T 10/47* (2013.01)

(58) Field of Classification Search
USPC .................... 60/274, 286, 295, 297, 301, 303
See application file for complete search history.

(56) References Cited

U.S. PATENT DOCUMENTS

| | | | |
|---|---|---|---|
| 6,947,831 B2 * | 9/2005 | van Nieuwstadt | 701/114 |
| 7,832,200 B2 * | 11/2010 | Kesse et al. | 60/286 |
| 7,926,263 B2 * | 4/2011 | Stroh et al. | 60/295 |
| 8,051,645 B2 * | 11/2011 | Chamarthi et al. | 60/295 |

(Continued)

FOREIGN PATENT DOCUMENTS

JP    2009-085172 A    4/2009

OTHER PUBLICATIONS

International Search Report of PCT/JP2011/071347 dated Dec. 20, 2011.

*Primary Examiner* — Binh Q Tran
(74) *Attorney, Agent, or Firm* — Sughrue Mion, PLLC (57) ABSTRACT

A reduction in the accuracy of a failure determination of a filter due to a reduction in the detection accuracy of a PM sensor is suppressed. To this end, provision is made for an NOx selective reduction catalyst arranged in an exhaust passage of the internal combustion engine to reduce NOx by means of a reducing agent supplied thereto, a supply device to supply urea water as the reducing agent from an upstream side of the NOx selective reduction catalyst, a PM sensor to detect an amount of particulate matter in an exhaust gas at the downstream side of the NOx selective reduction catalyst, and a control unit to make an amount of production of intermediate products from the urea water supplied from the supply device to ammonia smaller when an amount of particulate matter is detected by the PM sensor than when not detected.

5 Claims, 7 Drawing Sheets

(51) Int. Cl.
*F01N 3/10* (2006.01)
*F01N 13/00* (2010.01)
*F01N 9/00* (2006.01)
*F01N 3/023* (2006.01)
*B01D 53/94* (2006.01)

(56) References Cited

U.S. PATENT DOCUMENTS 8,490,476 B2 * 7/2013 Hopka et al. ............... 73/114.75
8,776,501 B2 * 7/2014 Carlill et al. .................... 60/286

* cited by examiner

EXHAUST GAS PURIFICATION APPARATUS FOR AN INTERNAL COMBUSTION ENGINE

CROSS REFERENCE TO RELATED APPLICATIONS

This is a National Stage of International Application No. PCT/JP2011/071347 filed Sep. 20, 2011, the content of all of which is incorporated herein by reference in its entirety.

TECHNICAL FIELD

The present invention relates to an exhaust gas purification apparatus for an internal combustion engine.

BACKGROUND ART

In an exhaust gas purification apparatus in which urea is supplied to an NOx selective reduction catalyst (hereinafter also referred to simply as an "NOx catalyst"), there has been known a technique in which when an amount of intermediate products, which have been produced in the course of the reaction from urea to ammonia and which have been accumulated in an exhaust passage, reaches an upper limit amount, the supply of urea water is prohibited (see, for example, a first patent document). According to this technique, a reducing agent can be supplied to the NOx catalyst until the amount of the intermediate products accumulated in the exhaust passage reaches the upper limit amount.

However, a filter for trapping particulate matter (hereinafter also referred to as "PM") may be arranged in the exhaust passage. In addition, in order to determine a failure of this filter, there may be provided with a PM sensor which serves to detect an amount of particulate matter in an exhaust gas. When the above-mentioned intermediate products adhere to electrodes or a cover of this PM sensor, there will be a fear that it may become difficult to accurately detect the amount of particulate matter. In that case, there will also be a fear that the accuracy in failure determination of the filter may become low.

PRIOR ART REFERENCES

Patent Documents

[First Patent Document] Japanese patent application laid-open No. 2009-085172

SUMMARY OF THE INVENTION

Problems to be Solved by the Invention

The present invention has been made in view of the problems as referred to above, and the object of the present invention is to suppress a reduction in the accuracy of failure determination of a filter due to a reduction in the detection accuracy of a PM sensor.

Means for Solving the Problem

In order to attain the above-mentioned object, an exhaust gas purification apparatus for an internal combustion engine according to the present invention is provided with:

an NOx selective reduction catalyst that is arranged in an exhaust passage of the internal combustion engine and reduces NOx by means of a reducing agent supplied thereto;

a supply device that supplies urea water as the reducing agent to said NOx selective reduction catalyst from an upstream side of said NOx selective reduction catalyst;

a PM sensor that detects an amount of particulate matter in an exhaust gas at a downstream side of said NOx selective reduction catalyst; and a control unit that serves to make an amount of production of intermediate products from the urea water supplied from said supply device to ammonia smaller when an amount of particulate matter is detected by said PM sensor than when not detected.

Here, the urea water supplied from the supply device into the exhaust gas changes into ammonia ($NH_3$). However, the intermediate products between the urea water supplied from the supply device and the ammonia finally produced may pass through the NOx selective reduction catalyst and adhere to the PM sensor, depending on the state of the exhaust gas or the NOx selective reduction catalyst. When the intermediate products adhere to the PM sensor, an output value of the PM sensor will be changed, thus making it difficult to detect the particulate matter in an accurate manner. On the other hand, when the PM sensor detects the amount of the particulate matter, the control unit decreases the production amount of the intermediate products.

For example, the internal combustion engine is controlled in such a manner that the production amount of the intermediate products decreases. By doing so, it is possible to suppress the detected value of the PM sensor from being changed due to the intermediate products, thus making it possible to suppress a reduction in the accuracy of the failure determination of the filter.

In addition, in the present invention, said control unit can make an amount of supply of the urea water smaller when the amount of the particulate matter is detected by said PM sensor than when the amount of the particulate matter is not detected by said PM sensor.

By making the amount of supply of the urea water smaller, the production amount of intermediate products is also made smaller, so that it is possible to suppress the intermediate products from adhering to the PM sensor. In addition, note that to make the amount of supply of the urea water smaller also includes stopping the supply of the urea water.

Moreover, in the present invention, said control unit can make a period of time to decrease the amount of supply of the urea water equal to or less than a prescribed period of time before the detection of the amount of the particulate matter by said PM sensor is started.

Here, by decreasing the amount of supply of the urea water, the reducing agent in the NOx selective reduction catalyst will be short or insufficient, thus giving rise to a fear that an NOx reduction rate may be reduced. To cope with this, by making the period of time to decrease the amount of the urea water to be supplied equal to or less than the prescribed period of time, it is possible to suppress the period of time to decrease the NOx reduction rate from becoming long. The prescribed period of time may also be set as a period of time in which an average value of an amount of emission of NOx becomes within an allowable range.

Further, in the present invention, provision is made for a filter that is arranged in the exhaust passage at an upstream side of said PM sensor for trapping the particulate matter in the exhaust gas, wherein said control unit can decrease the production amount of said intermediate products at the time of failure determination of said filter.

In that case, a failure determination of the filter can be carried out in a state where the detection accuracy of the PM sensor is high, so the accuracy of the failure determination can be made high.

In addition, in the present invention, the detection of the particulate matter by said PM sensor may be started when the amount of the ammonia having been adsorbed by said NOx selective reduction catalyst is equal to or less than a predetermined amount, and said predetermined amount may be calculated based on an upper limit value of an amount of ammonia, which can be adsorbed by said NOx selective reduction catalyst and which is calculated based on the extent of the deterioration of said NOx selective reduction catalyst obtained at the time of the last operation of said internal combustion engine, and an amount of ammonia to be adsorbed by said NOx selective reduction catalyst during the detection of the particulate matter by said PM sensor.

Here, it is difficult to detect the amount of particulate matter in an accurate manner, until a certain amount of particulate matter has adhered to the PM sensor. For this reason, it takes time to detect the amount of particulate matter by means of the PM sensor. When intermediate products adhere to the PM sensor in this period of time, the detected value of the PM sensor will change in response to influences from the intermediate products. Accordingly, by preventing the intermediate products from flowing out of the NOx selective reduction catalyst at the time of detecting the amount of particulate matter, the detection accuracy of the PM sensor can be made high.

However, the amount of ammonia ($NH_3$), which can be adsorbed by the NOx selective reduction catalyst, has a limit. When this limit is exceeded, it will become impossible for the NOx selective reduction catalyst to adsorb $NH_3$, and the intermediate products will flow to the downstream side. Accordingly, by preventing the amount of $NH_3$ having been adsorbed by the NOx selective reduction catalyst from exceeding the limit at the time of detecting the amount of particulate matter, the detection accuracy of the PM sensor can be made high. That is, it need only detect the amount of particulate matter, when the amount of $NH_3$ having been adsorbed by the NOx selective reduction catalyst is relatively small. For this reason, the detection of particulate matter by the PM sensor is started when the amount of $NH_3$ having been adsorbed by the NOx selective reduction catalyst is equal to or less than the predetermined amount. This predetermined amount is set as an amount of adsorption within which even if the NOx selective reduction catalyst thereafter adsorbs $NH_3$, the amount of $NH_3$ thus adsorbed does never reach the upper limit value.

Here, note that the upper limit value of the amount of $NH_3$ which can be adsorbed by the NOx selective reduction catalyst becomes smaller in accordance with the progress of deterioration of the NOx selective reduction catalyst. Accordingly, the predetermined amount may be decided according to the extent of the deterioration of the NOx selective reduction catalyst.

In addition, the amount of $NH_3$, which the NOx selective reduction catalyst will adsorb by the time the certain amount of particulate matter adheres to the PM sensor, changes according to an operating state of the internal combustion engine. That is, the amount of $NH_3$ having been adsorbed by the NOx selective reduction catalyst changes in accordance with an amount of NOx discharged from the internal combustion engine. For this reason, the predetermined amount need only be decided according to the amount of $NH_3$ to be adsorbed by the NOx selective reduction catalyst while detecting particulate matter. This amount of $NH_3$ can be calculated based, for example, on the amount of NOx, which will be discharged or emitted from the internal combustion engine by the time the certain amount of particulate matter adheres to the PM sensor, and the NOx reduction rate.

Here, note that the production amount of the intermediate products may be decreased, by raising the temperature of the NOx selective reduction catalyst or the temperature of the exhaust gas, or by decreasing the flow rate of the exhaust gas, or by decreasing the amount of adsorption of the reducing agent in the NOx selective reduction catalyst.

Effect of the Invention

According to the present invention, it is possible to suppress a reduction in the accuracy of the failure determination of a filter due to a reduction in the detection accuracy of a PM sensor.

MODES FOR CARRYING OUT THE INVENTION

Hereinafter, reference will be made to specific embodiments of an exhaust gas purification apparatus for an internal combustion engine according to the present invention based on the attached drawings.

First Embodiment

Figure 1:
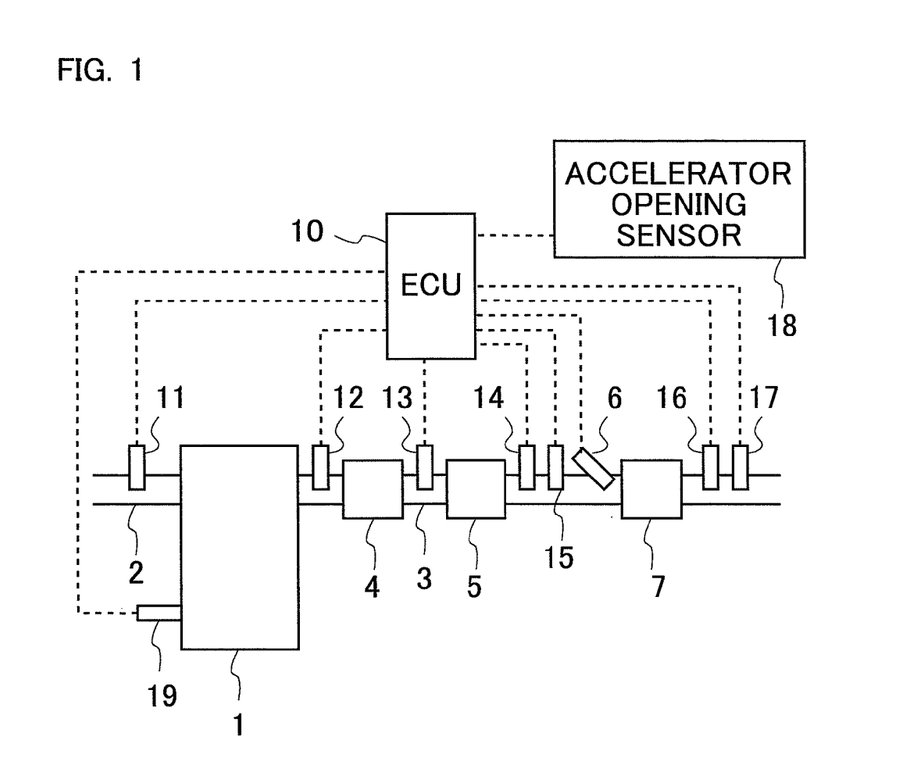
FIG. 1 is a view showing the schematic construction of an exhaust gas purification apparatus for an internal combustion engine according to embodiments of the present invention.

FIG. 1 is a view showing the schematic construction of an exhaust gas purification apparatus for an internal combustion engine according to this first embodiment of the present invention. An internal combustion engine 1 shown in FIG. 1 is a diesel engine, but it may be a gasoline engine.

An intake passage 2 and an exhaust passage 3 are connected to the internal combustion engine 1. An air flow meter 11 for detecting an amount of intake air flowing through the intake passage 2 is arranged in the intake passage 2. On the other hand, an oxidation catalyst 4, a filter 5, an injection valve 6, and an NOx selective reduction catalyst 7 (hereinafter referred to as an NOx catalyst 7) are sequentially arranged in the exhaust passage 3 in this order from an upstream side in the direction of flow of an exhaust gas.

The oxidation catalyst 4 should just be a catalyst which has an oxidation ability, and may be a three-way catalyst, for example. The oxidation catalyst 4 may be supported on the filter 5.

The filter 5 traps PM (particulate matter) contained in the exhaust gas. Here, note that a catalyst may be supported on the filter 5. As the particulate matter is trapped by the filter 5, the particulate matter accumulates or deposits on the filter 5 in a gradual manner. Then, by carrying out so-called regeneration processing of the filter 5 in which the temperature of the filter 5 is raised in a forced manner, the particulate matter deposited on the filter 5 can be oxidized and removed. For example, the temperature of the filter 5 can be raised by supplying HC to the oxidation catalyst 4. In addition, instead of providing with the oxidation catalyst 4, provision may also be made for other devices which serve to raise the temperature of the filter 5. Moreover, the temperature of the filter 5 may also be raised by causing hot gas to be discharged from the internal combustion engine 1.

The injection valve 6 injects a reducing agent. For the reducing agent, there can be used one derived from ammonia, such as, for example, urea water or the like. For example, the urea water injected from the injection valve 5 is hydrolyzed by the heat of the exhaust gas, as a result of which ammonia ($NH_3$) is produced, and a part or all thereof adsorbs to the NOx catalyst 7. In the following, it is assumed that urea water is injected as the reducing agent from the injection valve 6. Here, note that in this embodiment, the injection valve 6 corresponds to a supply device in the present invention.

The NOx catalyst 7 reduces the NOx in the exhaust gas in the existence of the reducing agent. For example, if ammonia ($NH_3$) is caused to be adsorbed to the NOx catalyst 7 in advance, it will be possible to reduce NOx by means of ammonia at the time when the NOx passes through the NOx catalyst 7.

A first exhaust gas temperature sensor 12 for measuring the temperature of the exhaust gas is arranged in the exhaust passage 3 at a location upstream of the oxidation catalyst 4. A second exhaust gas temperature sensor 13 for measuring the temperature of the exhaust gas is arranged in the exhaust passage 3 at a location downstream of the oxidation catalyst 4 and upstream of the filter 5. A third exhaust gas temperature sensor 14 for detecting the temperature of the exhaust gas and a first NOx sensor 15 for detecting the concentration of NOx in the exhaust gas are arranged in the exhaust passage 3 at locations downstream of the filter 5 and upstream of the injection valve 6. A second NOx sensor 16 for measuring the concentration of NOx in the exhaust gas and a PM sensor 17 for measuring the amount of particulate matter in the exhaust gas are arranged in the exhaust passage 3 at location downstream of the NOx catalyst 7. All of these sensors are not indispensable, but some of them can be provided as required.

In the internal combustion engine 1 constructed as stated above, there is arranged in combination therewith an ECU 10 which is an electronic control unit for controlling the internal combustion engine 1. This ECU 10 controls the internal combustion engine 1 in accordance with the operating conditions of the internal combustion engine 1 and/or driver's requirements.

The above-mentioned sensors, an accelerator opening sensor 18, which is able to detect an engine load by outputting an electrical signal corresponding to an amount of depression of an accelerator pedal, and a crank position sensor 19, which detects the number of revolutions per minute of the engine, are connected to the ECU 10 through electrical wiring, and the output signals of these sensors are inputted to the ECU 10. On the other hand, the injection valve 6 is connected to the ECU 10 through electrical wiring, so that the injection valve 6 is controlled by the ECU 10.

When the amount of particulate matter deposited on the filter 5 becomes equal to or more than a predetermined amount, the ECU 10 will carry out the above-mentioned regeneration processing of the filter 5. Here, note that the regeneration processing of the filter 5 may be carried out at the time when the mileage or travel distance of a vehicle on which the internal combustion engine 1 is mounted becomes equal to or more than a predetermined distance. In addition, the regeneration processing of the filter 5 may be carried out at each specified period of time.

In addition, the ECU 10 carries out failure determination of the filter 5 based on the amount of particulate matter detected by the PM sensor 17. Here, when a failure such as cracking of the filter 5 or the like occurs, the amount of particulate matter passing through the filter 5 will increase. If the PM sensor 17 detects such an increase in the amount of particulate matter, the failure of the filter 5 can be determined.

For example, the failure determination of the filter 5 is carried out by making a comparison between an integrated value of the amount of particulate matter during a predetermined period of time calculated based on the detected value of the PM sensor 17, and an integrated value of the amount of particulate matter during the predetermined period of time in the case of assuming that the filter 5 is in a predetermined state. Here, note that the failure determination of the filter 5 may be carried out based on an amount of increase in the detected value of the PM sensor 17 in the predetermined period of time. For example, when the increased amount of the detected value of the PM sensor 17 in the predetermined period of time is equal to or greater than a threshold value, a determination may be made that the filter 5 is in failure.

Figure 2:
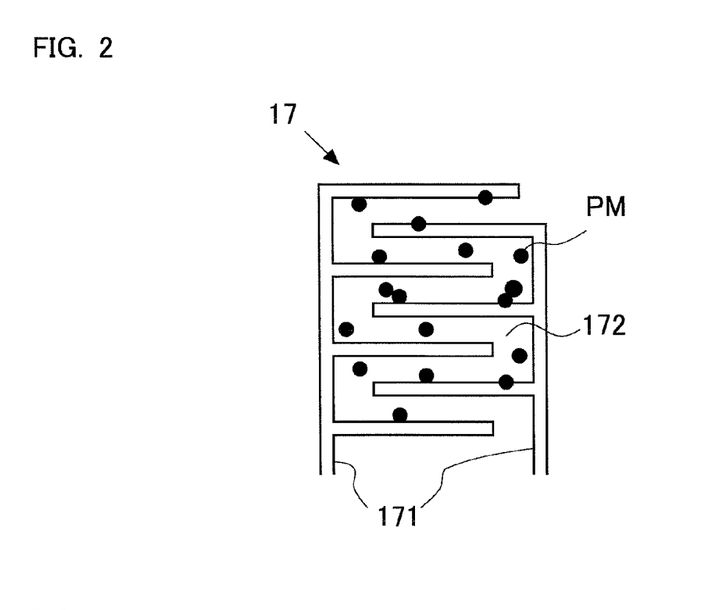
FIG. 2 is a view showing the schematic construction of a PM sensor.

Here, FIG. 2 is a schematic construction view of the PM sensor 17. The PM sensor 17 is a sensor that outputs an electrical signal corresponding to the amount of particulate matter deposited on itself. The PM sensor 17 is constructed to be provided with a pair of the electrodes 171, and an insulating material 172 arranged between the pair of the electrodes 171. If particulate matter adheres between the electrodes 171, the electric resistance between the electrodes 171 will change. Such a change of the electric resistance has a correlation with the amount of particulate matter in the exhaust gas, so that the amount of particulate matter in the exhaust gas can be detected based on the change of the electric resistance. This amount of particulate matter may also be a mass of particulate matter per unit time, or may also be a mass of particulate matter in a predetermined period of time. Here, note that the construction of the PM sensor 17 is not limited to what is shown in FIG. 2. That is, the PM sensor 17 should just be a PM sensor which serves to detect particulate matter and of which the detected value changes under the influence of the reducing agent.

Figure 3:
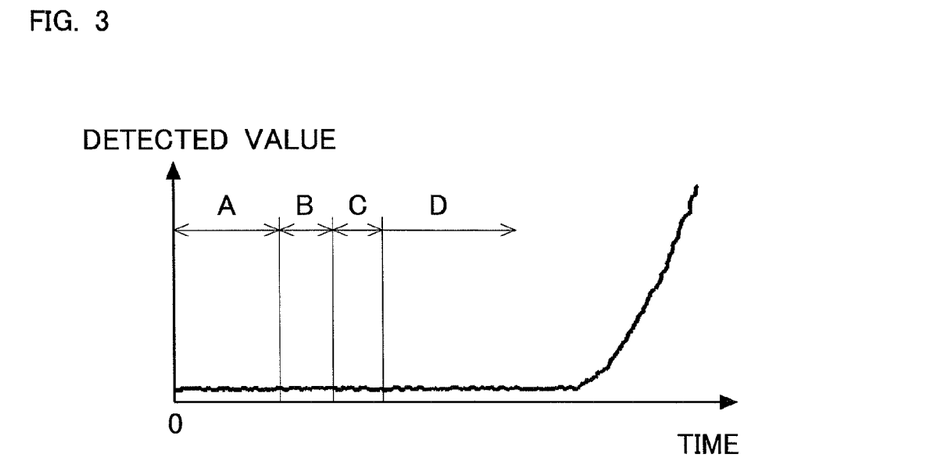
FIG. 3 is a time chart showing the change over time of a detected value of the PM sensor.

Next, FIG. 3 is a time chart showing the change over time of the detected value of the PM sensor 17. A period of time denoted by A immediately after starting of the internal combustion engine 1 is a period of time in which the water condensed in the exhaust passage 3 may adhere to the PM sensor 17. If the water adheres to the PM sensor 17, the detected value of the PM sensor 17 will change, or the PM sensor 17 will fail, and hence, in this period of time, the detection of the amount of particulate matter by means of the PM sensor 17 is not carried out.

In a period of time denoted by B after the period of time denoted by A, processing to remove the particulate matter having adhered to the PM sensor 17 at the time of the last operation of the internal combustion engine 1 (hereinafter referred to as PM removal processing) is carried out. This PM removal processing is carried out by raising the temperature of the PM sensor 17 to a temperature at which the particulate matter is oxidized. In this period of time denoted by B, too, the detection of the amount of particulate matter by means of the PM sensor 17 is not carried out.

A period of time denoted by C after the period of time denoted by B is a period of time required for the temperature of the PM sensor 17 to become a temperature suitable for the detection of particulate matter. That is, the temperature of the PM sensor 17 becomes higher than the temperature suitable for the detection of particulate matter in the period of time denoted by B, so it is waited until the temperature of the PM sensor 17 drops to reach the temperature suitable for the detection of particulate matter. In this period of time denoted by C, too, the detection of the amount of particulate matter by means of the PM sensor 17 is not carried out.

Then, the detection of particulate matter is carried out in a period of time denoted by D after the period of time denoted by C. Here, note that even in the period of time denoted by D, the detected value of the PM sensor 17 does not increase until a certain amount of particulate matter accumulates or deposits on the PM sensor 17. That is, the detected value begins to increase from a point in time at which a certain amount of particulate matter deposits so that an electric current comes to flow between the electrodes 171. Thereafter, the detected value increases according to the amount of particulate matter in the exhaust gas.

Here, the PM sensor 17 is arranged at a location downstream of the filter 5. For that reason, particulate matter, which has passed through the filter 5 without being trapped by the filter 5, adheres to the PM sensor 17. Accordingly, the amount of particulate matter deposited in the PM sensor 17 becomes an amount which corresponds to an integrated value of the amount of the particulate matter having passed through the filter 5.

Figure 4:
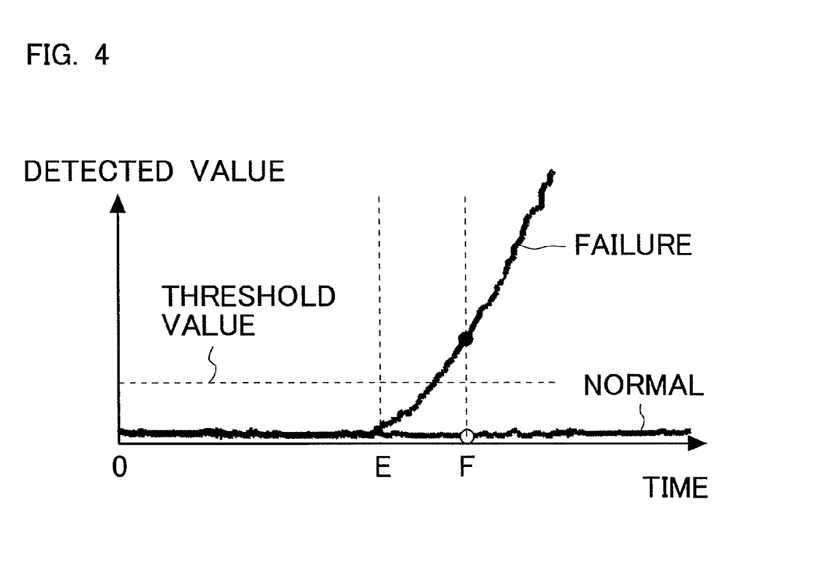
FIG. 4 is a time chart showing the changes over time of the detected values of the PM sensor in the case of normal operation of a filter and in the case of a failure of the filter.

Here, FIG. 4 is a time chart showing the changes over time of the detected values of the PM sensor 17 in the case of normal operation of the filter 5 and in the case of a failure of the filter 5. In cases where the filter 5 is in failure, particulate matter deposits on the PM sensor 17 in an early period of time, so a point in time E at which the detected value of the PM sensor 17 begins to increase becomes earlier, as compared with the case in which the filter 5 is normal. For this reason, for example, if the detected value at the time when a predetermined period of time F has elapsed after the starting of the internal combustion engine 1 is equal to or more than a threshold value, it can be determined that the filter 5 is in failure. This predetermined period of time F is a period of time in which if the filter 5 is normal, the detected value of the PM sensor 17 will not increase, and whereas if the filter 5 is in failure, the detected value of the PM sensor 17 will increase. This predetermined period of time F is obtained through experiments, etc. In addition, the threshold value has also been obtained, through experiments or the like, as a lower limit value of the detected value of the PM sensor 17 at the time when the filter 5 is in failure.

However, it can also be considered that the PM sensor 17 is arranged at a location downstream of the filter 5 and upstream of the NOx catalyst 7. However, if the PM sensor 17 is arranged in such a position, the distance from the filter 5 to the PM sensor 17 will become short. For this reason, there is a fear that the particulate matter having passed through a cracked or split part of the filter 5 may arrive at areas surrounding the PM sensor 17 without being dispersed into the exhaust gas. As a result, depending on the position in which the filter 5 has cracked or split, particulate matter hardly adheres to the PM sensor 17, and hence, there is a fear that particulate matter may not be detected, and the accuracy of failure determination may be decreased.

In contrast to this, in this embodiment, the PM sensor 17 is arranged at the downstream side of the NOx catalyst 7, so the distance from the filter 5 to the PM sensor 17 is long. For this reason, the particulate matter having passed through the filter 5 disperses in the exhaust gas in the areas surrounding the PM sensor 17. Accordingly, the particulate matter can be detected without depending upon the cracked or split position of the filter 5. However, because the PM sensor 17 is arranged at the downstream side of the injection valve 6, there is a fear that the reducing agent injected from the injection valve 6 may adhere to the PM sensor 17. Such a reducing agent adhering to the PM sensor 17 is, for example, urea and its intermediate products (biuret, cyanuric acid) ranging from urea to ammonia. Thus, when the reducing agent adheres to the PM sensor 17, there is a fear that the detected value of the PM sensor 17 may change.

Figure 5:
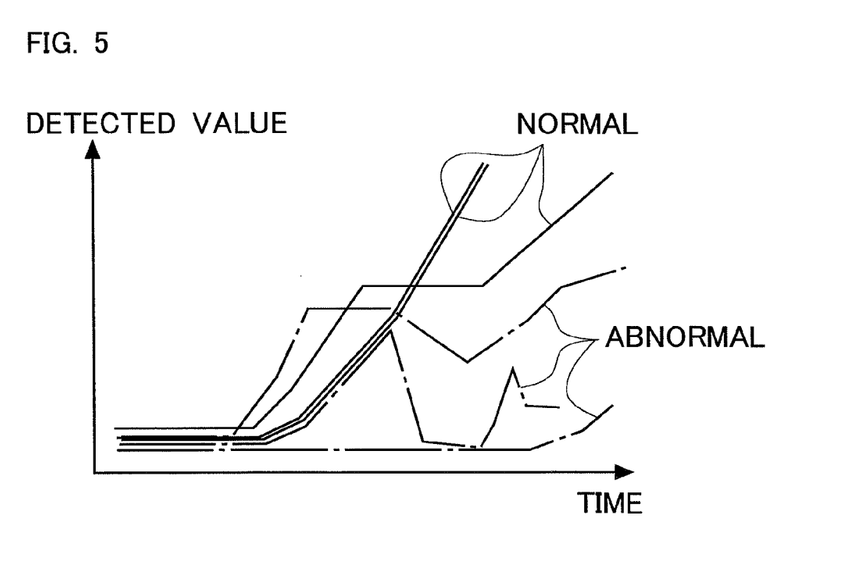
FIG. 5 is a time chart showing the changes over time of the detected values of the PM sensor in the case of the detected value being normal and in the case of the detected value being abnormal.

Here, FIG. 5 is a time chart showing the changes over time of the detected values of the PM sensor 17 in the case of the detected value being normal and in the case of the detected value being abnormal. The abnormal detected value can be set as a detected value at the time when the reducing agent has adhered to the PM sensor 17.

The normal detected value is a detected value which increases with the passage of time, or which does not change. That is, the detected value increases according to the amount of particulate matter having adhered to the PM sensor 17. On the other hand, the abnormal detected value may not only increase, but also decrease. Here, when the above-mentioned intermediate products have adhered to and deposited on the PM sensor 17 so that they become equal to or more than a predetermined amount, the detected value of the PM sensor 17 increases as in the case where particulate matter has deposited. Here, biuret, which is an intermediate product, is produced at temperatures of 132 to 190 degrees C., and vaporizes when the temperature thereof becomes higher than those temperatures. In addition, cyanuric acid, which is also an intermediate product, is produced at temperatures of 190 to 360 degree C., and vaporizes when the temperature thereof becomes higher than those temperatures. Thus, as compared with particulate matter, the intermediate products vaporize at low temperatures. For this reason, the intermediate products having adhered to the PM sensor 17 vaporize when the temperature of the exhaust gas of the internal combustion engine 1 is high. As a result, the amount of deposition of the intermediate products decreases, so the detected value of the PM sensor 17 also decreases. This is a phenomenon that does not occur when only the particulate matter has deposited on the PM sensor 17.

In addition, when the intermediate products adhere to and deposit on a cover of the PM sensor 17, there is a fear that the cover may be closed or blocked. When this cover is closed or blocked with the intermediate products, it becomes impossible for particulate matter to arrive at the electrodes 171, thus making it difficult for the particulate matter to be detected. Accordingly, the time when the increase in the detected value of the PM sensor 17 begins becomes later than in the case of the PM sensor 17 being normal. For that reason, there is a fear that the accuracy of the failure determination of the filter 5 may become low.

In this manner, when the reducing agent passes through the NOx catalyst 7, there is a fear that the failure determination of the filter 5 may become difficult. Accordingly, in this embodiment, the internal combustion engine 1 is controlled so as to make it more difficult for the intermediate products (biuret, cyanuric acid) from urea to ammonia to adhere to the PM sensor 17 when the PM sensor 17 detects the amount of particulate matter than when it does not detect particulate matter. Specifically, the amount of supply of the urea water is decreased.

Figure 6:
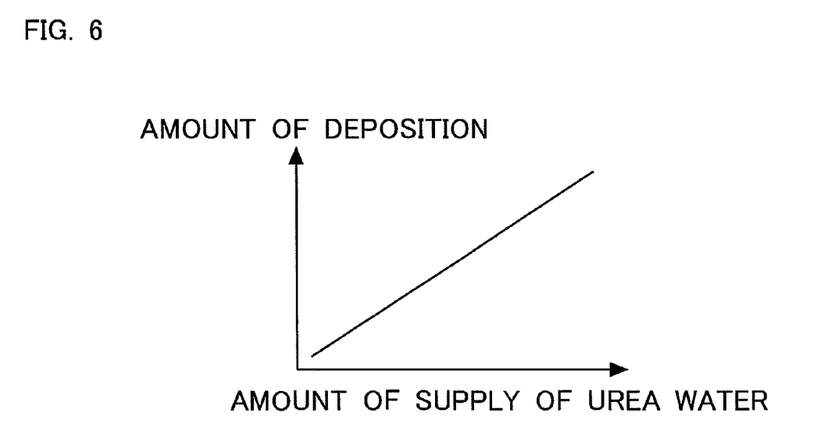
FIG. 6 is a view showing the relation between an amount of supply of urea water and an amount of intermediate products adhered or deposited to the PM sensor.

Here, FIG. 6 is a view showing the relation between the amount of supply of the urea water and the amount of intermediate products adhered or deposited to the PM sensor 17. As shown in FIG. 6, the more the amount of supply of the urea water, the more becomes the amount of adhesion or deposition of the intermediate products to the PM sensor 17. Accordingly, the amount of deposition of the intermediate products to the PM sensor 17 can be decreased by decreasing the amount of supply of the urea water.

However, by decreasing the amount of supply of the urea water, the reducing agent in the NOx catalyst 7 will be short or insufficient, thus giving rise to a fear that an NOx reduction rate may be reduced. Accordingly, when the PM sensor 17 detects the amount of particulate matter, or when the failure determination of the filter 5 is carried out, the amount of supply of the urea water need only be regulated so that the amount of emission of NOx into the atmosphere falls within an allowable range. For example, the amount of supply of the urea water may be regulated in such a manner that an average value of NOx emission when the vehicle with the internal combustion engine 1 mounted thereon has traveled the predetermined distance falls within an allowable range. In addition, the amount of supply of the urea water may be regulated in such a manner that an amount of NOx emission per unit time falls within an allowable range. Moreover, a period of time in which the NOx reduction rate is decreased may be decreased, by limiting a period of time to regulate the amount of supply of the urea water.

Figure 7:
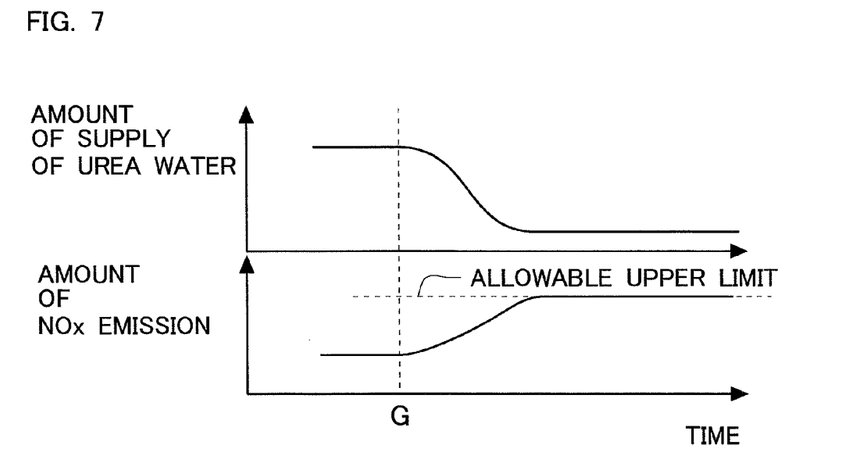
FIG. 7 is a time chart showing the changes over time of the amount of supply of urea water and an amount of emission of NOx discharged to the atmosphere.

FIG. 7 is a time chart showing the changes over time of the amount of supply of urea water and an amount of emission of NOx discharged to the atmosphere. At a point in time indicated by G, a request for a failure determination of the filter 5 is made. The request for the failure determination of the filter 5 is made for each predetermined distance of travel or after regeneration processing of the filter 5, for example. Then, the amount of supply of the urea water is decreased after the point in time indicated by G.

The amount of emission of NOx increases in accordance with the decreasing amount of supply of the urea water decreases, as shown in FIG. 7. Then, in this embodiment, the amount of supply of the urea water is controlled in such a manner that the amount of emission of NOx becomes equal to or less than an upper limit value of the allowable range (hereinafter, referred to as an allowable upper limit). This allowable upper limit may also be as an upper limit value of the allowable range for the amount of NOx emission per unit time. Also, the allowable upper limit may also be as an upper limit value of the amount of NOx emission per unit time of which an average value falls within the allowable range. Here, note that the amount of supply of the urea water may be set based on the number of engine revolutions per unit time and the engine load. The relation among the amount of supply of the urea water, the number of engine revolutions per unit time, and the engine load may be obtained through experiments, etc., in advance. In addition, feedback control of the amount of supply of the urea water may be carried out based on the NOx concentration in the exhaust gas detected by the second NOx sensor 16.

Moreover, when carrying out the failure determination of the filter 5, the internal combustion engine 1 may be controlled in such a manner that the amount of generation of NOx in the internal combustion engine 1 is decreased. Further, at the time of detecting the amount of particulate matter by means of the PM sensor 17, there can be combined other control which serves to make it difficult for the intermediate products (biuret, cyanuric acid) to adhere to the PM sensor 17.

For example, the internal combustion engine 1 may be controlled in such a manner that the temperature of the NOx catalyst 7 or the temperature of the exhaust gas is made high. In addition, the internal combustion engine 1 may be controlled in such a manner that the flow rate of the exhaust gas is made small, or the flow speed of the exhaust gas is made low. Moreover, the internal combustion engine 1 may be controlled in such a manner that the adsorption rate of $NH_3$ in the NOx catalyst 7 is made low, or the amount of adsorption of $NH_3$ is made small.

Here, when the temperature of the NOx catalyst 7 or the exhaust gas is low, the reaction of the urea such as thermal decomposition thereof will take a relatively long time, so that the urea will pass through the NOx catalyst 7 before the reaction of the urea is completed. Accordingly, by making high the temperature of the NOx catalyst 7 or the exhaust gas, it is possible to suppress the intermediate products from flowing out of the NOx catalyst 7.

Further, when the flow rate of the exhaust gas is large, a period of time for the urea to be in contact with the NOx catalyst 7 becomes short, so that the urea will pass through the NOx catalyst 7 before the reaction of the urea is completed. Accordingly, by making small the flow rate of the exhaust gas, it is possible to suppress the intermediate products from flowing out of the NOx catalyst 7. Here, note that the flow speed of the exhaust gas may be made low, or the amount of intake air in the internal combustion engine 1 may be decreased.

Furthermore, the larger the amount of the $NH_3$ having adsorbed to the NOx catalyst 7, the more difficult it becomes for hydrolysis to proceed, and hence, it becomes easy for the urea to pass through the NOx catalyst 7 before the reaction of the urea is completed. Accordingly, by decreasing the amount of $NH_3$ having adsorbed to the NOx catalyst 7, it is possible to suppress the intermediate products from flowing out of the NOx catalyst 7. Here, note that the rate of adsorption of $NH_3$ may be made low. The rate of adsorption of $NH_3$ is a ratio of the amount of $NH_3$ having adsorbed to the NOx catalyst 7 with respect to a maximum amount of $NH_3$ which can be adsorbed to the NOx catalyst 7.

Figure 8:
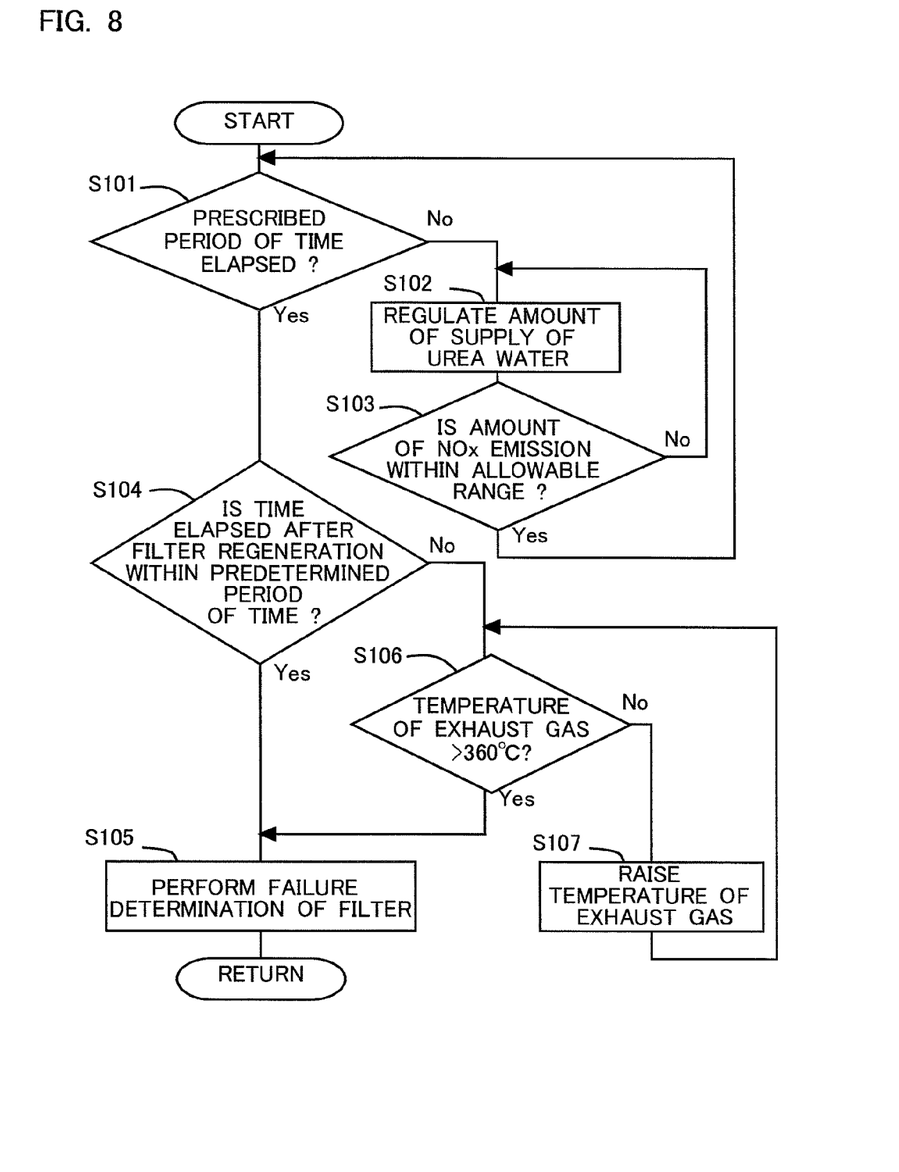
FIG. 8 is a flow chart showing a flow for determining a failure of a filter according to a first embodiment.

FIG. 8 is a flow chart showing a flow or routine for determining the failure of the filter 5 according to this embodiment. This routine is carried out by means of the ECU 10 at the time when a request for the determination of the failure of the filter 5 has been made.

In step S101, it is determined whether a prescribed period of time (for example, a period of 5 minutes) has elapsed after the amount of supply of the urea water is decreased. That is, it is determined whether the prescribed period of time has elapsed after the amount of NOx emission increases. In this step, it is determined whether the amount of supply of the urea water has become such an amount that can suppress the production of the intermediate products. Here, note that the amount of supply of the urea water may be made 0. That is, the supply of the reducing agent may be stopped.

The prescribed period of time is set as a period of time in which even if the amount of NOx emission has increased, the average value of the amount of NOx emission will fall within the allowable range. That is, even when the amount of NOx emission becomes large at the time of the failure determination of the filter 5, if the amount of NOx emission is small in other periods of time, the average value of the amount of NOx emission will fall within the allowable range. In this manner, the prescribed period of time is set as a period of time in which even if the amount of supply of the urea water has been decreased, the average value of the amount of NOx emission will fall within the allowable range. This prescribed period of time has been beforehand obtained through experiments, etc., and stored in the ECU 10.

In cases where an affirmative determination is made in step S101, the routine advances to step S102. In step S102, the amount of supply of the urea water is regulated.

Then, in step S103, it is determined whether the average value of the amount of NOx emission from the NOx catalyst 7 is within the allowable range. In this step, it may be determined whether the amount of NOx emission per unit time becomes equal to or less than the allowable upper limit shown in FIG. 7. The amount of NOx emission per unit time is obtained based on the detected value of the second NOx sensor 16. In cases where an affirmative determination is made in step S103, the routine returns to step S101. On the other hand, in cases where a negative determination is made in step S103, the routine returns to step S102. In this manner, in step S102, the amount of supply of the urea water is regulated until the average value of the amount of NOx emission from the NOx catalyst 7 falls within the allowable range. Here, note that in this embodiment, the ECU 10, which carries out the processing of step S101 through step S103, corresponds to a control unit in the present invention.

Then, in cases where an affirmative determination is made in step S101, the routine goes to step S104. In step S104, it is determined whether a period of time elapsed after the regeneration processing of the filter 5 is carried out is within a prescribed period of time (for example, a period of 60 minutes). Here, the regeneration processing of the filter 5 is carried out by raising the temperature of the filter 5 to a temperature at which the particulate matter is oxidized. By raising the temperature of the filter 5 in this manner, the temperature of the PM sensor 17 also goes up, so that the intermediate products adhered to the PM sensor 17 are removed. Accordingly, if the failure determination of the filter 5 is carried out at this time, the detected value of the PM sensor 17 will not be affected by the influence of the intermediate products, and hence, the accuracy of the failure determination becomes high. Thus, in cases where an affirmative determination is made in step S104, the routine advances to step S105, in which the failure determination of the filter 5 is carried out.

On the other hand, in cases where a negative determination is made in step S104, the routine advances to step S106. In step S106, the internal combustion engine 1 is controlled in such a manner that the temperature of the NOx catalyst 7 or the temperature of the exhaust gas at the downstream side of the NOx catalyst 7 becomes a temperature (for example, 360 degrees C.) at which the intermediate products vaporize. For example, the temperature of the NOx catalyst 7 or the temperature of the exhaust gas at the downstream side of the NOx catalyst 7 is caused to go up by raising the temperature of the gas discharged from the internal combustion engine 1, or by causing HC to be discharged from the internal combustion engine 1 for reaction in the oxidation catalyst 4. Here, note that the cover of the PM sensor 17 may be heated to 360 degrees C., for example, by means of a heater.

In that case, the temperature of the PM sensor 17 goes up to the temperature at which the intermediate products vaporize, so that the intermediate products can be removed from the PM sensor 17. Here, biuret, which is an intermediate product, vaporizes at a temperature of 190 degrees C. or above, and cyanuric acid vaporizes at a temperature of 360 degrees C. or above. For this reason, in this embodiment, the intermediate products are caused to vaporize, by raising the temperature of the PM sensor 17 to the temperature of 360 degrees C. or above. Then, if the failure determination of the filter 5 is carried out after this time, the detected value of the PM sensor 17 will not be affected by the influence of the intermediate products, so the accuracy of the failure determination becomes high.

That is, in cases where an affirmative determination is made in step S106, the routine advances to step S105, in which the failure determination of the filter 5 is carried out. On the other hand, in cases where a negative determination is made in step S106, the routine advances to step S107 where the temperature of the exhaust gas is caused to go up further, and then a return is made to step S106.

As explained above, according to this embodiment, the amount of supply of the reducing agent is decreased at the time of carrying out the failure determination of the filter 5 than at the time of not carrying out it, so it is possible to suppress the reducing agent from adhering to the PM sensor 17. For this reason, it is possible to suppress the accuracy of the detected value of the PM sensor 17 from being made low due to the reducing agent having adhered to the PM sensor 17. As a result, it is possible to enhance the accuracy of the failure determination of the filter 5.

Second Embodiment

In this second embodiment, in addition to decreasing the amount of supply of the reducing agent as explained in the first embodiment, the detection of the amount of particulate matter by means of the PM sensor 17 is started at the time when the amount of $NH_3$ having been adsorbed by the NOx catalyst 7 is equal to or less than a predetermined amount. Here, note that the failure determination of the filter 5 may be started at the time when the amount of $NH_3$ having been adsorbed by the NOx catalyst 7 is equal to or less than the predetermined amount.

Here, when the intermediate products having passed through the NOx catalyst 7 adhere between the electrodes 171 of the PM sensor 17, the detected value of the PM sensor 17 will increase quickly, as compared with the case where only particulate matter adheres between them. In addition, due to the vaporization of the intermediate products having adhered to the PM sensor 17, the detected value of the PM sensor 17 may be decreased. On the other hand, when the intermediate products having passed through the NOx catalyst 7 adhere to the cover of the PM sensor 17, the time at which an increase in the detected value of the PM sensor 17 begins becomes later or delayed.

When the NOx catalyst 7 has adsorbed a large amount of $NH_3$, the progress of the hydrolysis of the urea will become slow, so that the intermediate products pass through the NOx catalyst 7. Accordingly, when the amount of $NH_3$ having been adsorbed by the NOx catalyst 7 is small, the detected value of the PM sensor 17 can not be easily affected by the influence from the intermediate products. For example, when the failure determination of the filter 5 is made within a period of time after $NH_3$ has desorbed from the NOx catalyst 7 and before the amount of adsorption of the $NH_3$ increases again, the accuracy of the determination will become high. Here, note that the amount of $NH_3$, which can be adsorbed by the NOx catalyst 7, has a limit. Here, an upper limit value of the amount of $NH_3$ which can be adsorbed by the NOx catalyst 7 is hereinafter referred to as an "upper limit amount of adsorption".

Then, for example, when the internal combustion engine 1 is operated at high load, the temperature of the NOx catalyst 7 will be about 400 degrees C., and the $NH_3$ having been adsorbed by the NOx catalyst 7 will be desorbed therefrom. However, it is difficult to continue such an operating state for a long period of time. In addition, if a certain amount of particulate matter does not adhere, the PM sensor 17 can not detect the amount of particulate matter, as explained in FIG. 3. However, when the amount of $NH_3$ having been adsorbed by the NOx catalyst 7 will reach the upper limit amount of adsorption by the time a certain amount of particulate matter adheres to the PM sensor 17, the intermediate products will come to pass through the NOx catalyst 7, so that the accuracy of the detected value of the PM sensor 17 will become low.

Accordingly, in this embodiment, the detection of the amount of particulate matter is started at the time when the amount of $NH_3$ having been adsorbed by the NOx catalyst 7 is less than the predetermined amount.

Figure 9:
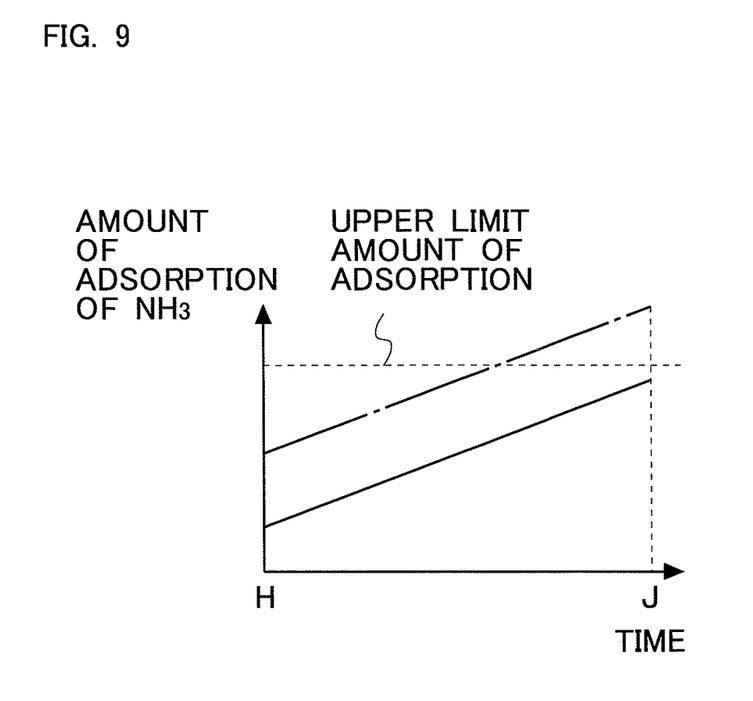
FIG. 9 is a time chart showing the changes over time of amounts of $NH_3$ having been adsorbed by an NOx catalyst.

Here, FIG. 9 is a time chart showing the changes over time of the amounts of $NH_3$ having been adsorbed by the NOx catalyst 7 (the amounts of $NH_3$ adsorption). FIG. 9 shows the changes over time of the amounts of $NH_3$ adsorption in the period of time indicated by D in FIG. 3. Here, note that FIG. 9 may also be as a time chart showing the changes over time of the amounts of $NH_3$ adsorption from a point in time H at which it has become possible to detect the amount of particulate matter by means of the PM sensor 17. That is, the point in time indicated by H may also be as a point in time at which it has become possible to detect the amount of particulate matter by means of the PM sensor 17. In addition, a point in time indicated by J shows a point in time at which the failure determination of the filter 5 is carried out. For example, a difference between the detected value of the PM sensor 17 at the point in time indicated by J and the detected value of the PM sensor 17 at the point in time indicated by H is calculated as an integrated value of the amount of particulate matter in a period of time from H to J. The failure determination of the filter 5 can be carried out by making a comparison between this integrated value with a predetermined value. Moreover, by taking J in FIG. 9 and F in FIG. 4 as the same point in time, the failure determination of the filter 5 can also be carried out in the manner as explained in FIG. 4.

In FIG. 9, a solid line shows a case where the amount of $NH_3$ having been adsorbed by the NOx catalyst 7 at the point in time J to carry out the failure determination of the filter 5 has not reached the upper limit amount of adsorption. On the other hand, an alternate long and short dash line shows a case where the amount of $NH_3$ having been adsorbed by the NOx catalyst 7 at the point in time J to carry out the failure determination of the filter 5 has exceeded the upper limit amount of adsorption.

In this embodiment, the amount of $NH_3$ having been adsorbed by the NOx catalyst 7 at the point in time indicated by H is made to be equal to or less than the predetermined amount, so that the amount of $NH_3$ having been adsorbed by the NOx catalyst 7 at the point in time J to carry out the failure determination of the filter 5 does not reach the upper limit amount of adsorption.

That is, the amount of $NH_3$ having been adsorbed by the NOx catalyst 7 is regulated in such a manner that the amount of $NH_3$ having been adsorbed by the NOx catalyst 7 becomes equal to or less than the predetermined amount, at the point in time H at which it has become possible to detect the amount of particulate matter by means of the PM sensor 17. This predetermined amount can be made as the upper limit value of the amount of $NH_3$ at which the amount of $NH_3$ having been adsorbed by the NOx catalyst 7 does not reach the upper limit amount of adsorption when it comes to the point in time J where the failure determination of the filter 5 is made.

Here, if the internal combustion engine 1 is operated at high load, it will be possible to decrease the amount of $NH_3$ having been adsorbed by the NOx catalyst 7, but it will be difficult to continue the high load operation of the engine 1 for a long period of time. Accordingly, the failure determination of the filter 5 may be carried out after a condition in which $NH_3$ desorbs from the NOx catalyst 7 has been satisfied. Here, when the temperature of the NOx catalyst 7 becomes high, $NH_3$ will desorb from the NOx catalyst 7, so that the amount of $NH_3$ having been adsorbed by the NOx catalyst 7 will decrease.

For example, at the time of regeneration of the filter 5, the temperature of the NOx catalyst 7 goes up to a temperature at which $NH_3$ desorbs. Then, after the regeneration of the filter 5, the amount of $NH_3$ having been adsorbed by the NOx catalyst 7 has become equal to or less than the predetermined amount, and hence, the failure determination of the filter 5 need only be carried out at this time.

In addition, in order to make it easy to grasp the amount of $NH_3$ having been adsorbed by the NOx catalyst 7, processing to remove $NH_3$ from the NOx catalyst 7 is carried out in a periodic manner. At this time, $NH_3$ is caused to desorb from the NOx catalyst 7 by making high the temperature of the NOx catalyst 7. Even after this, the amount of $NH_3$ having been adsorbed by the NOx catalyst 7 has become equal to or less than the predetermined amount, so the failure determination of the filter 5 need only be carried out.

Here, note that in order to raise the temperature of the filter 5 or the NOx catalyst 7, the temperature of the gas discharged from the internal combustion engine 1 is raised, or HC is supplied to the oxidation catalyst 4, by carrying out post injection or increasing the amount of EGR gas, etc., for example. In addition, the temperature of the filter 5 or the NOx catalyst 7 can also be raised by supplying HC into the exhaust gas from the upstream side of the oxidation catalyst 4. After carrying out such control, it is possible to make the failure determination of the filter 5.

Moreover, when the amount of the urea water supplied from the injection valve 6 is made smaller than an amount which is required for reduction of the NOx in the exhaust gas, the $NH_3$ having been adsorbed by the NOx catalyst 7 will be consumed to decrease by the NOx in the exhaust gas. Accordingly, the amount of $NH_3$ having been adsorbed by the NOx catalyst 7 may be decreased to be equal to or less than the predetermined amount, by decreasing the amount of the urea water supplied from the injection valve 6.

Further, the predetermined amount may be a prescribed value, or may be changed according to the extent of the deterioration of the NOx catalyst 7. Here, the upper limit amount of adsorption becomes smaller in accordance with the increasing extent of the deterioration of the NOx catalyst 7. That is, the amount of $NH_3$ having been adsorbed by the NOx catalyst 7 becomes easy to exceed the upper limit amount of adsorption. Accordingly, the predetermined amount may also be made smaller in accordance with the increasing extent of the deterioration of the NOx catalyst 7. That is, the amount of $NH_3$ adsorption at the point in time indicated by J in FIG. 9 is made smaller by decreasing the amount of $NH_3$ adsorption at the point in time indicated by H in FIG. 9. The predetermined amount may be set as follows.

For example, the NOx reduction rate in the NOx catalyst 7 has been calculated at the time of the last operation of the internal combustion engine 1, and the extent of the deterioration of the NOx catalyst 7 has been obtained from the NOx reduction rate thus calculated. Here, note that the NOx reduction rate can be calculated as a ratio of an amount of NOx reduced or removed by the NOx catalyst 7 with respect to an amount of NOx flowing into the NOx catalyst 7. These amounts of NOx may also be as the concentrations of NOx. For example, the amount of NOx reduced by the NOx catalyst 7 can be calculate from a value which is obtained by subtracting the detected value of the second NOx sensor 16 from the detected value of the first NOx sensor 15. In addition, the NOx reduction rate can be calculated by dividing the value, which is obtained by subtracting the detected value of the second NOx sensor 16 from the detected value of the first NOx sensor 15, by the detected value of the first NOx sensor 15. There is a correlation between the NOx reduction rate and the extent of the deterioration of the NOx catalyst 7, and hence, if this correlation has been obtained in advance, the extent of the deterioration will be able to be obtained from the NOx reduction rate.

Then, the upper limit value of the amount of $NH_3$ which can be adsorbed by the NOx catalyst 7 (the upper limit amount of adsorption) can be obtained from the extent of the deterioration of the NOx catalyst 7. There is a correlation between the extent of the deterioration of the NOx catalyst 7 and the upper limit amount of adsorption, and hence, if this correlation has been obtained in advance, the upper limit amount of adsorption will be able to be obtained from the extent of the deterioration.

In addition, in order to carry out the failure determination of the filter 5, it is necessary for a certain amount of particulate matter to adhere to the PM sensor 17. Here, note that an amount of deposition of particulate matter, which is necessary in order to carry out the failure determination of the filter 5, is hereinafter referred to as a "necessary amount of deposition". This necessary amount of deposition is decided by the specification of the PM sensor 17, etc., for example. Then, the predetermined amount is decided in such a manner that the amount of $NH_3$ having been adsorbed by the NOx catalyst 7 does not exceed the upper limit amount of adsorption, until the amount of particulate matter adhered to the PM sensor 17 reaches the necessary amount of deposition. Here, the amount of $NH_3$ having been adsorbed by the NOx catalyst 7 changes according to the amount of NOx in the exhaust gas. That is, the amount of $NH_3$ having been adsorbed by the NOx catalyst 7 at the point in time J to carry out the failure determination of the filter 5 changes according to a total amount of NOx discharged from the internal combustion engine 1 in the period of time from H to J in FIG. 9.

In order to calculate this total amount of NOx, a load of the internal combustion engine 1 is obtained which will be required by the time the amount of particulate matter adhered to the PM sensor 17 becomes the necessary amount of deposition. Here, the amount of particulate matter increases according to the load of the internal combustion engine 1. Accordingly, an amount of particulate matter is calculated which will be discharged from the internal combustion engine 1 by the time the amount of particulate matter adhered to the PM sensor 17 becomes the necessary amount of deposition. The amount of particulate matter discharged from the internal combustion engine 1 has been obtained through experiments, etc., in advance. Then, the load of the internal combustion engine 1 corresponding to this amount of particulate matter discharged from the internal combustion engine 1 is calculated. This load may be obtained as a sum total of the amount of intake air, for example. The relation between the amount of particulate matter discharged from the internal combustion engine 1 and the load of the internal combustion engine 1 is obtained through experiments, etc., in advance. Also, the sum total of the amount of intake air may be a prescribed value.

Then, the total amount of NOx discharged from the internal combustion engine 1 at the time when the internal combustion engine 1 is operated at this load is calculated. Because the amount of NOx discharged from the internal combustion engine 1 is in a correlation with the operating state of the internal combustion engine 1, the total amount of NOx can be calculated from the operating state of the internal combustion engine 1. The urea water is supplied from the injection valve 6 according to this total amount of NOx, so the total amount of NOx and the amount of supply of the urea water are correlated with each other. Then, by taking into consideration the NOx reduction rate in the NOx catalyst 7, an amount of $NH_3$ to be consumed in the NOx catalyst 7 can be calculated. Moreover, the amount of $NH_3$ having been adsorbed by the NOx catalyst 7 (hereinafter, referred to as a total amount of adsorption) can be calculated from the amount of supply of the urea water and the amount of $NH_3$ to be consumed.

Then, the predetermined amount is decided so as to satisfy the following relation: (the predetermined amount<the upper limit amount of adsorption−the total amount of adsorption). That is, the predetermined amount is decided in such a manner that even if the total amount of adsorption is added to the predetermined amount, the upper limit amount of adsorption can not be reached. In that case, the amount of $NH_3$ adsorbed to the NOx catalyst 7 does not exceed the upper limit amount of adsorption, until the amount of particulate matter adhered to the PM sensor 17 becomes the necessary amount of deposition.

Figure 10:
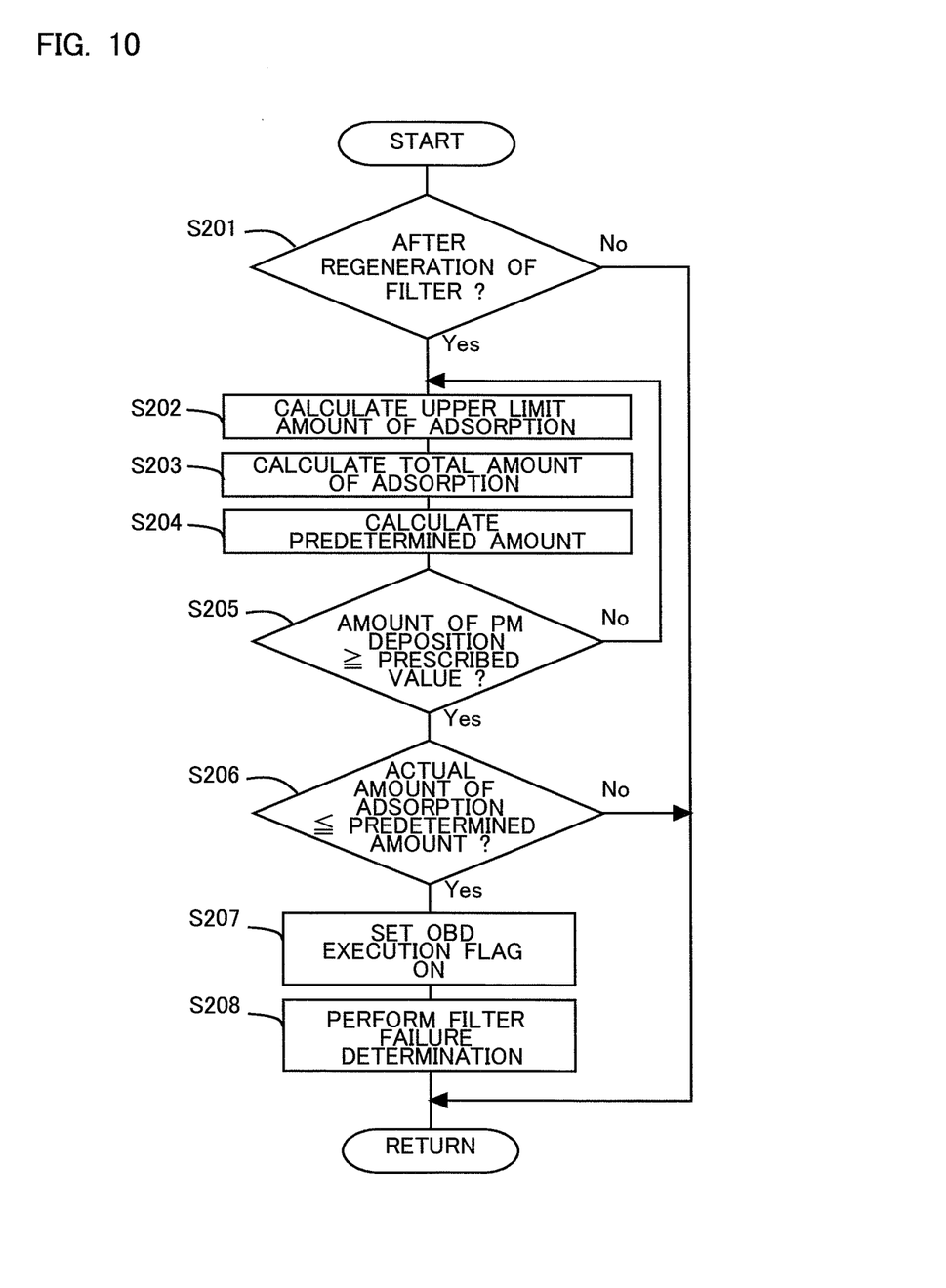
FIG. 10 is a flow chart showing a flow for determining a failure of a filter according to a second embodiment.

FIG. 10 is a flow chart showing a flow or routine for determining the failure of the filter 5 according to this embodiment. This routine is carried out by means of the ECU 10 at each predetermined time interval.

In step S201, it is determined whether the regeneration processing of the filter 5 has been carried out. In this step, it is determined whether the amount of $NH_3$ having been adsorbed by the NOx catalyst 7 is small to a sufficient extent. When it is before $NH_3$ adsorbs to the NOx catalyst 7, it is decided that the regeneration processing of the filter 5 has been carried out.

In cases where an affirmative determination is made in step S201, the routine advances to step S202, whereas in cases where a negative determination is made, there is a fear that intermediate products may adhere to the PM sensor 17, and hence this routine is ended.

In step S202, the upper limit amount of adsorption is calculated. That is, the upper limit value of the amount of $NH_3$ which can be adsorbed by the NOx catalyst 7 is calculated based on the NOx reduction rate calculated at the time of the last operation. Here, note that the NOx reduction rate is stored into the ECU 10 each time the internal combustion engine 1 is operated. The relation between the NOx reduction rate and the upper limit amount of adsorption may be obtained through experiments, etc., in advance, and stored into the ECU 10.

The total amount of adsorption is calculated in step S203. That is, the amount of $NH_3$ having been adsorbed by the NOx catalyst 7 at the point in time J to carry out the failure determination of the filter 5 is estimated based on the NOx reduction rate and the amount of supply of the urea water. The relation between them may be obtained and mapped through experiments, etc., in advance, and may be stored into the ECU 10.

In step S204, the predetermined amount is calculated. The predetermined amount is obtained by subtracting a certain amount of margin from the value obtained by subtraction of the total amount of adsorption from the upper limit amount of adsorption.

In step S205, it is determined whether the amount of particulate matter deposited on the filter 5 is equal to or greater than the prescribed value. This prescribed value is set as a value with which the accuracy of the failure determination of the filter 5 becomes high. That is, immediately after carrying out the regeneration processing of the filter 5, particulate matter has not substantially deposited on the filter 5, so particulate matter tends to pass through the filter 5. For this reason, there is a fear that the accuracy of the failure determination of the filter 5 may become low, and hence, the failure determination waits until the amount of particulate matter deposited on the filter 5 becomes equal to or greater than the prescribed value.

In cases where an affirmative determination is made in step S205, the routine advances to step S206, whereas in cases where a negative determination is made, the routine returns to step S202.

In step S206, it is determined whether an amount of $NH_3$ having been actually adsorbed by the NOx catalyst 7 (an actual amount of adsorption) is equal to or less than the predetermined amount. That is, it is determined whether the amount of $NH_3$ which the NOx catalyst 7 will adsorb by the time the failure determination of the filter 5 is completed exceeds the upper limit amount of adsorption.

In cases where an affirmative determination is made in step S206, the routine advances to step S207, whereas in cases where a negative determination is made, there is a fear that the accuracy of the failure determination of the filter 5 may become low, and hence, this routine is ended.

In step S207, an OBD execution flag is set or turned on. Here, the OBD execution flag is a flag which is set to on when the failure determination of the filter 5 can be executed, and which is set to off when the failure determination of the filter 5 can not be executed.

In step S208, the failure determination of the filter 5 is carried out. That is, based on the detected value of the PM sensor 17, it is determined whether the filter 5 is in failure.

As described above, according to this embodiment, it is possible to suppress the intermediate products from flowing out from the NOx catalyst 7, by the time the amount of particulate matter adhered to the PM sensor 17 increases to a sufficient extent. Accordingly, it is possible to suppress the intermediate products from adhering to the PM sensor 17, thus making it possible to suppress the detected value of the PM sensor 17 from being changed due to the influence of the intermediate products. As a result of this, it is possible to enhance the accuracy of the failure determination of the filter 5 to a further extent.

EXPLANATION OF REFERENCE NUMERALS AND CHARACTERS 1 internal combustion engine
2 intake passage
3 exhaust passage
4 oxidation catalyst
5 filter
6 injection valve
7 NOx selective reduction catalyst
10 ECU
11 air flow meter
12 first exhaust gas temperature sensor
13 second exhaust gas temperature sensor
14 third exhaust gas temperature sensor
15 first NOx sensor
16 second NOx sensor
17 PM sensor
18 accelerator opening sensor
19 crank position sensor

The invention claimed is:

1. An exhaust gas purification apparatus for an internal combustion engine comprising:
   an NOx selective reduction catalyst that is arranged in an exhaust passage of the internal combustion engine and reduces NOx by means of a reducing agent supplied thereto;
   a supply device that supplies urea water as the reducing agent to said NOx selective reduction catalyst from an upstream side of said NOx selective reduction catalyst;
   a PM sensor configured to detect an amount of particulate matter in an exhaust gas at a downstream side of said NOx selective reduction catalyst; and
   a control unit including control logic configured to regulate an amount of production of intermediate products from the urea water supplied from said supply device to ammonia to be smaller when an amount of particulate matter is detected by said PM sensor than when not detected.

2. The exhaust gas purification apparatus for an internal combustion engine as set forth in claim 1, wherein
   said control unit regulates an amount of supply of the urea water to be smaller when the amount of the particulate matter is detected by said PM sensor than when the amount of the particulate matter is not detected by said PM sensor.

3. The exhaust gas purification apparatus for an internal combustion engine as set forth in claim 2, wherein
   said control unit controls a period of time to decrease the amount of supply of the urea water equal to or less than a prescribed period of time before the detection of the amount of the particulate matter by said PM sensor is started.

4. The exhaust gas purification apparatus for an internal combustion engine as set forth in claim 1, wherein
   provision is made for a filter that is arranged in the exhaust passage at an upstream side of said PM sensor for trapping the particulate matter in the exhaust gas, wherein said control unit decreases the production amount of said intermediate products at the time of failure determination of said filter.

5. The exhaust gas purification apparatus for an internal combustion engine as set forth in claim 1, wherein
   the detection of the particulate matter by said PM sensor is started when the amount of the ammonia having been adsorbed by said NOx selective reduction catalyst is equal to or less than a predetermined amount, and said predetermined amount is calculated based on an upper limit value of an amount of ammonia, which is capable of being adsorbed by said NOx selective reduction catalyst and which is calculated based on the extent of the deterioration of said NOx selective reduction catalyst obtained at the time of the last operation of said internal combustion engine, and an amount of ammonia to be adsorbed by said NOx selective reduction catalyst during the detection of the particulate matter by said PM sensor.

* * * * *